US012484577B2

(12) United States Patent
Coats et al.

(10) Patent No.: US 12,484,577 B2
(45) Date of Patent: Dec. 2, 2025

(54) MONOTERPENOID/PHENYLPROPANOID CONTAINING COMPOUNDS AND METHODS OF THEIR MAKING AND USE AS SEED TREATMENTS

(71) Applicants: KITTRICH CORPORATION, Pomona, CA (US); IOWA STATE UNIVERSITY RESEARCH FOUNDATION, INC., Ames, IA (US)

(72) Inventors: Joel R. Coats, Ames, IA (US); James S. Klimavicz, Ames, IA (US); Edmund J. Norris, Ames, IA (US); Steven M. Bessette, West Palm Beach, FL (US); A. David Lindsay, Denver, CO (US)

(73) Assignees: Kittrich Corporation, Pomona, CA (US); Iowa State University Research Foundation, Inc., Ames, IA (US)

( * ) Notice: Subject to any disclaimer, the term of this patent is extended or adjusted under 35 U.S.C. 154(b) by 232 days.

(21) Appl. No.: 18/330,092

(22) Filed: Jun. 6, 2023

(65) Prior Publication Data
US 2023/0345932 A1    Nov. 2, 2023

Related U.S. Application Data

(62) Division of application No. 16/328,274, filed as application No. PCT/US2017/048291 on Aug. 23, 2017, now Pat. No. 11,696,581.

(60) Provisional application No. 62/378,541, filed on Aug. 23, 2016.

(51) Int. Cl.
| | | |
|---|---|---|
| A01N 25/00 | (2006.01) | |
| A01N 25/08 | (2006.01) | |
| A01N 37/06 | (2006.01) | |
| A01N 37/10 | (2006.01) | |
| A01N 37/38 | (2006.01) | |
| A01N 39/04 | (2006.01) | |
| A01N 43/16 | (2006.01) | |
| A01P 13/02 | (2006.01) | |

(52) U.S. Cl.
CPC .......... *A01N 25/006* (2013.01); *A01N 25/08* (2013.01); *A01N 37/06* (2013.01); *A01N 37/10* (2013.01); *A01N 37/38* (2013.01); *A01N 39/04* (2013.01); *A01N 43/16* (2013.01); *A01P 13/02* (2021.08)

(58) Field of Classification Search
CPC ........ A01N 25/00; A01N 25/08; A01N 37/06; A01N 37/10; A01N 37/38; A01N 39/04; A01N 43/16; A01P 13/02
See application file for complete search history.

(56) References Cited

FOREIGN PATENT DOCUMENTS

CN    102731301 A    10/2012

OTHER PUBLICATIONS

Johnson, Controlling Insects in Stored Grain, Jul. 2009, University of Kentucky College of Agriculture, ENTFACT-145, 8 pages, (//entomology.ca.uky.edu/files/efpdf1/ef145.pdf).
Kumbhar, Eco-friendly Pest Management Using Monoterpenoids. I. Antifungal Efficacy of Thymol Derivatives, Journal of Scientific & Industrial Research, Aug. 2001 pp. 645-648, vol. 60.

*Primary Examiner* — Trevor Love
(74) *Attorney, Agent, or Firm* — Hudak, Shunk & Farine Co. LPA

(57) ABSTRACT

Disclosed are compounds having a monoterpenoid and/or phenylpropanoid moiety and methods of their making and use as pesticidal compounds, such as seed treatments.

2 Claims, 2 Drawing Sheets

MONOTERPENOID/PHENYLPROPANOID CONTAINING COMPOUNDS AND METHODS OF THEIR MAKING AND USE AS SEED TREATMENTS

CROSS-REFERENCE TO RELATED APPLICATIONS

This patent application claims the benefit of U.S. Provisional Patent Application No. 62/378,541, filed Aug. 23, 2016. The entire disclosures of the above-identified prior provisional patent application and all other concurrently filed non-provisional patent applications claiming the benefit from the provisional application are incorporated herein by reference.

BACKGROUND

The disclosed embodiments relate to compounds having a monoterpenoid and/or phenylpropanoid moiety, and methods of their making and use.

Many plant essential oils contain monoterpene or monoterpenoid compounds, some of which are insecticidal. Their potency is typically less than for conventional synthetic insecticides, but they are just as effective at causing insect mortality or control when a sufficient dose is delivered to the pest.

In some instances, such compounds are volatile and rapidly biodegradable, which results in virtually no insecticidal residues. Absence of residues is a positive feature for many application scenarios, but in certain situations, some persistence or a slow release mechanism would make these monoterpenoids more useful, and open new market opportunities. These properties could allow for their use as seed treatments, enabling longer residual character in soil.

The development of the example embodiments of low-volatility esters as "composite" molecules (e.g., bis-esters, tris-esters, tetrakis-esters, pentakis-esters, and hexakis-esters) has allowed for insect ingestion of an insecticidal compound, followed by metabolic release of the insecticidal monomers in the insect gut. Some of these molecules may then breakdown into parent terpenoids and act as toxicants/repellents in their respective environments.

The disclosed embodiments are believed to overcome one or more deficiencies in the art.

SUMMARY

One aspect of the disclosed embodiments relates to a compound of formula (I):

—L,  (I)

where
$R_1$ is each independently a phenylpropanoid or monoterpenoid moiety;
L is a polyester-containing linking moiety having a structure

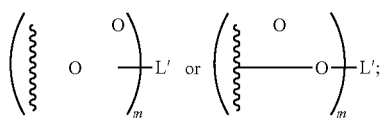

L' is selected from the group consisting of branched or unbranched saturated or unsaturated alkyl or cycloalkyl, aryl, and heteroaryl; and
m is from 2-6.

Another aspect of the disclosed embodiments relates to a method of making a compound having a structure of formula (II):

This method involves
reacting $R_1$—OH with

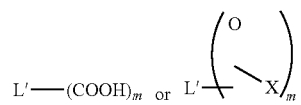

$R_1$—OH with
under conditions effective to form a compound having a structure of formula (III), where
$R_1$ is a monoterpenoid or phenylpropanoid moiety;
L' is selected from the group consisting of branched or unbranched saturated or unsaturated alkyl or cycloalkyl, aryl, and heteroaryl;
X is halogen; and
m is from 2-6.

A further aspect of the disclosed embodiments relates to a compound of formula (III):

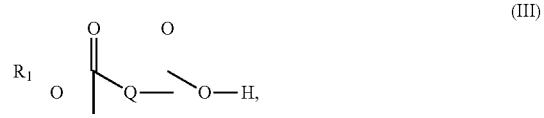

where
$R_1$ is a phenylpropanoid or monoterpenoid moiety and
Q is selected from the group consisting of branched or unbranched saturated or unsaturated $C_0$-$C_4$ alkyl, branched or unbranched $C_0$-$C_4$ ketone, and branched or unbranched $C_0$-$C_4$ amine.

Another aspect of the disclosed embodiments relates to a compound of formula (IV):

$R_1$-A,  (IV)

where
A is —O—$R_2$, or

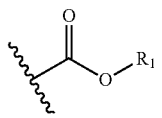

$R_1$ is a phenylpropanoid or monoterpenoid moiety;
$R_2$ is a phenylpropanoid or monoterpenoid moiety or is selected from the group consisting M, substituted or unsubstituted $C_3$-$C_7$ unbranched or branched alkyl, substituted or unsubstituted $C_2$-$C_7$ unbranched or branched alkenyl, substituted or unsubstituted $C_3$-$C_7$ unbranched or branched alkynyl, substituted or unsubstituted $C_3$-$C_7$ unbranched or branched cycloalkyl, substituted or unsubstituted heteroaryl, and substituted or unsubstituted $C_3$-$C_7$ unbranched or branched cycloalkenyl; and M is a counterion selected from the group consisting of sodium, potassium, calcium, magnesium, iron, zinc, copper, and an amine;

and when A is

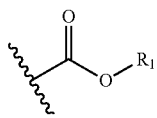

then the compound is not

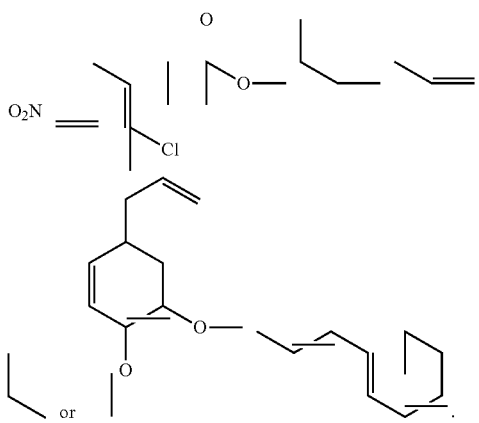

A further aspect of the disclosed embodiments relates to a method of making a compound having a structure of formula (V):

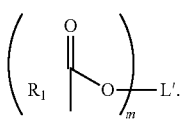 (IV)

This method involves
reacting $R_1$—COOH with L'-(OH)$_m$
or

with L'-(OH)$_m$
under conditions effective to form a compound of formula (V), where $R_1$ is each independently a phenylpropanoid or monoterpenoid moiety;
L' is selected from the group consisting of branched or unbranched saturated or unsaturated alkyl or cycloalkyl, aryl, and heteroaryl;

X is halogen; and
and
m is from 2-6.

Another aspect of the disclosed embodiments relates to a method of killing an insect. This method involves providing the disclosed insecticide composition in a location to attract an invertebrate, such as an insect. The insect is attracted to the bait, consumes the bait, and is killed by the consumed insecticide composition.

A further aspect of the disclosed embodiments relates to a plant seed comprising the seed treatment composition on its exterior surface. The insect feeds on or comes into contact with the insecticidal seed treatment and dies. Moreover, the breakdown products of this residual insecticide applied to plant seed may be repellent to insect pests, further preventing them from feeding on the root tissue of the plant in question.

The disclosed embodiments relate to the synthesis of oligoesters from monoterpenoids obtained from biorational sources for use as insecticidal compounds provided as toxic bait formulations against various arthropod species.

According to an example embodiment, the principal monoterpenoid and phenylpropanoid molecules employed are citronellic acid, cinnamic acid, thymol, eugenol, geraniol, menthol, and carvacrol. The poly-esters can be synthesized directly from a monoterpenoid acid or a monoterpenoid alcohol or phenol. Pseudo-dimers and pseudo-trimers have been synthesized by esterifying ethylene glycol, propylene glycol, or glycerol with the citronellic acid, cinnamic acid, or geranic acid. When two cinnamic acid, two citronellic acid, or two geranic acid molecules are esterified with one of the glycols (or three of them are esterified with glycerol), the resultant di-esters (tri-esters, poly-esters) have much lower volatility and greater stability than the monoterpenoid molecules. The spectrum of compounds disclosed and synthesized according to the disclosed embodiments also includes: inverse esters, which were designed from a simple organic dicarboxylic acid (e.g., oxalic, succinic, fumaric, maleic, adipic) and molecules of a monoterpenoid alcohol or phenol. For example, alcohols may include cinnamic alcohol, linalool, geraniol, menthol, etc., while phenols may include carvacrol, thymol, or eugenol.

Certain example embodiments disclosed herein achieve improved bait acceptance of natural monoterpenoid insecticides for ingestion by arthropods, including insects such as flies, cockroaches, and mosquitoes. In one embodiment, the ingestion of the compounds by these pests leads to hydrolysis of the esters in the insect midgut and release of the individual monoterpenoid insecticides and subsequently to toxicity to the pest.

All of the component parts of the example embodiments may be natural or derived from natural sources, and some are included on the U.S. Environmental Protection Agency's Exempt List 25b and/or the U.S. Food and Drug Administration's Generally Recognized As Safe (GRAS) lists, which includes oils and compounds widely used in the food, flavor, fragrance, and cosmetics industries and considered safe for consumer uses.

The example embodiments include, without limitation, bis-, tris-, tetra-, penta-, and hexakis-esters.

Numerous monoterpenoid derivatives are capable of causing significant mortality compared to the control.

Figure 2:
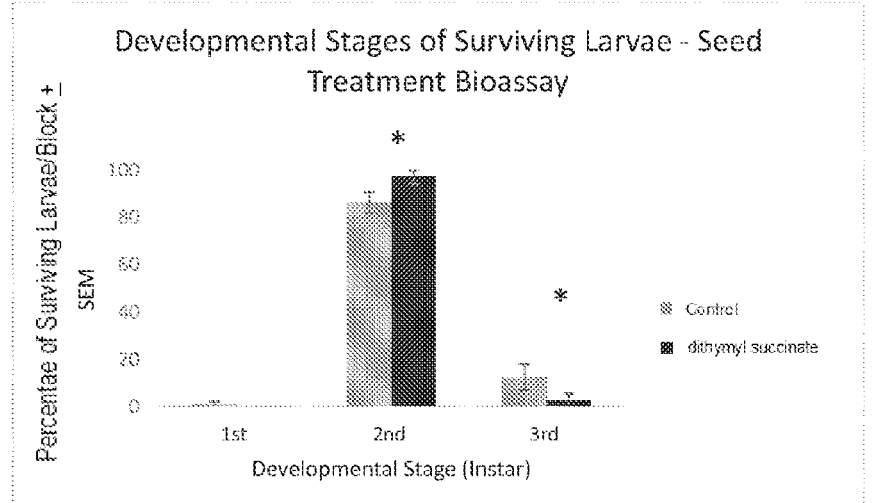
Figure 3:
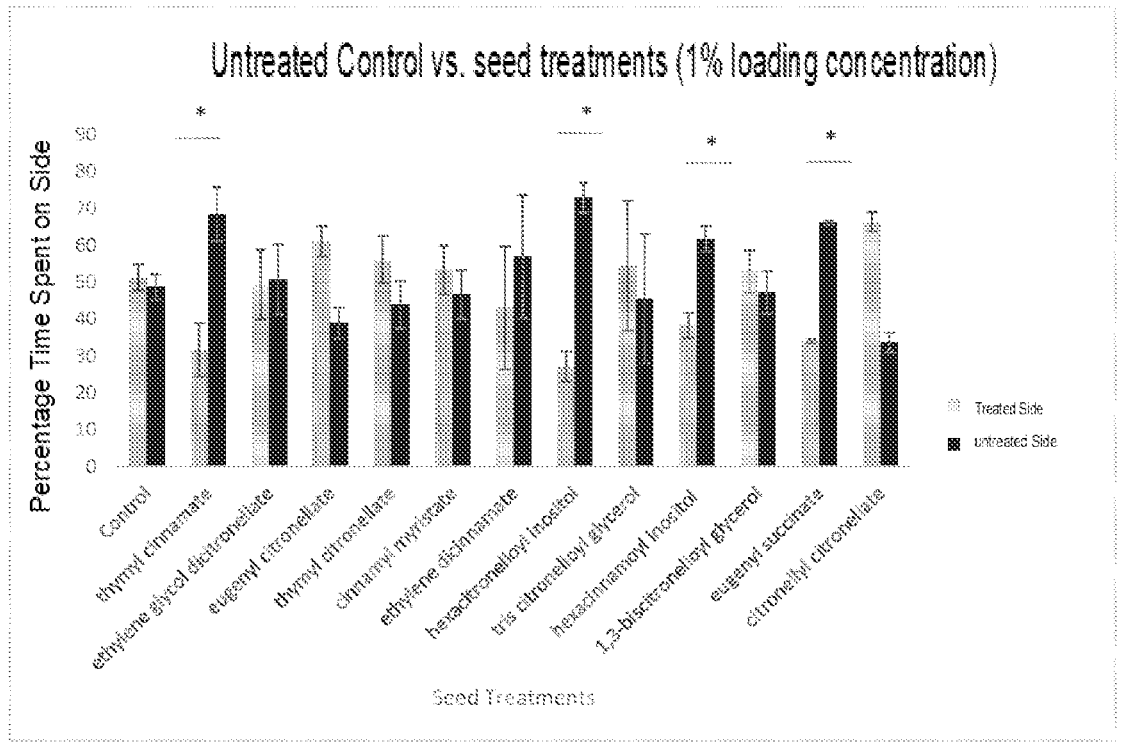
Figure 4:
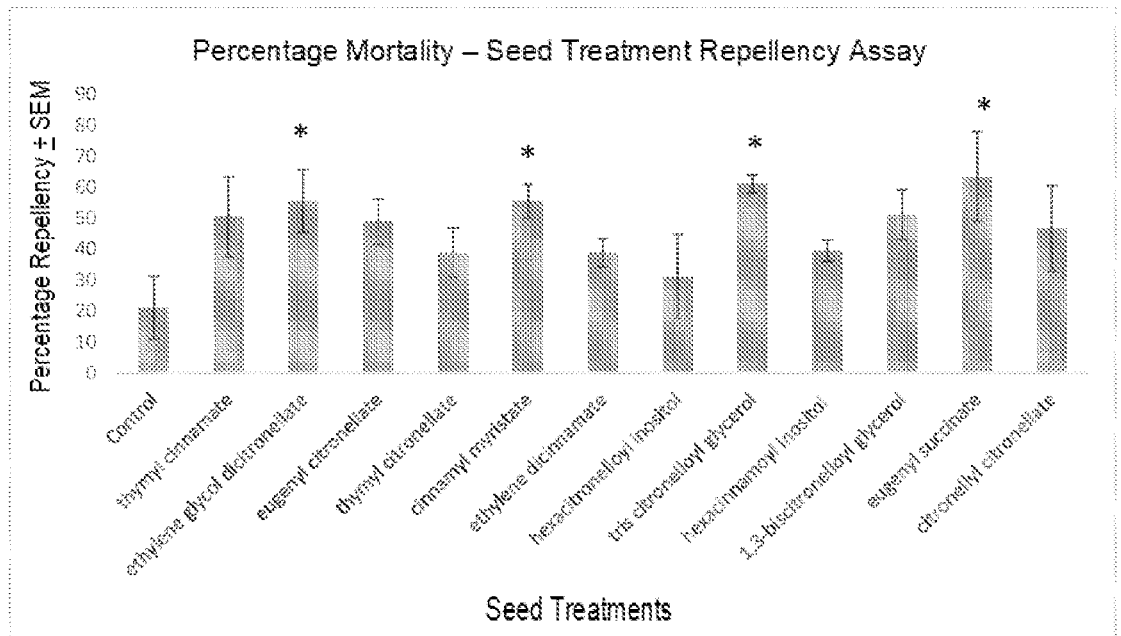

FIG. 2 is a representative graph demonstrating the capability of select monoterpenoid derivatives to modulate the growth and development of western corn rootworm exposed to seeds that have been treated with these compounds. The percentages of larvae at each life stage was significantly different than in the control.

FIG. 3 is a graph showing the total percentage of larvae accounted for on the treated- and untreated-corn sides in the western corn rootworm repellency assay. A number of monoterpenoid derivatives caused significant repellency against western corn rootworm as demonstrated by the significantly lower percentage of rootworm present on the treated side compared to the control.

FIG. 4 is a graph showing the insecticidal character of various seed treatments within the repellency arena. This data indicates that even in the presence of an untreated source of food (the untreated-corn side), statistically significant mortality occurs for select monoterpenoid derivatives.

DETAILED DESCRIPTION

The disclosed embodiments relates to compounds having a monoterpenoid and/or phenylpropanoid moiety, and methods of their making and use.

In particular, the disclosed embodiments relate to monoterpenoid and phenylpropanoid compounds derived from biorational sources. As discussed in more detail infra, the monoterpenoid and phenylpropanoid derivative compounds of the embodiments disclosed herein are particularly suited for use as insecticides and plant protectants, including insecticidal and repellent seed coatings/treatments that act systemically and/or topically.

Throughout this disclosure, the following terms are provided for clarity.

As used herein, the term "monoterpenoid" refers to a monoterpene-like substance and is used to refer collectively to monoterpenoid derivatives as well as monoterpenoid analogs. By "monoterpene," it is meant a compound having a 10-carbon skeleton with non-linear branches. A monoterpene technically refers to a compound with two isoprene units connected in a head-to-end manner. Monoterpenoids can therefore include monoterpenes, alcohols, ketones, aldehydes, esters, ethers, acids, hydrocarbons without an oxygen functional group, and so forth. It is common practice to refer to certain phenolic compounds, such as eugenol, thymol, and carvacrol, as monoterpenoids because their function is essentially the same as a monoterpenoid. However, these compounds are not technically "monoterpenoids" (or "monoterpenes") because they are not synthesized by the same isoprene biosynthesis pathway, but rather by production of phenols from tyrosine. However, common practice will be followed herein.

The term "monoterpenoid alcohol" means any monoterpenoid or phenylpropanoid alcohol or phenol that occurs naturally, including, for example and without limitation: acyclic, unsaturated monoterpenoids, including citronellol, linalool, geraniol, nerol, and lavandulol; cyclic or bicyclic unsaturated monoterpenoids, including carveol, pinocarveol, myrcenol, myrtenol, α-terpineol, 4-terpeniol, verbenol, and perillyl alcohol; cyclic or polycyclic saturated monoterpenoids, including menthol, fenchol, borneol, isoborneol, and myrtanol; isopropyl cresols, including thymol, carvacrol, or 4-isopropyl-3-methylphenol; cycloheptatrienolones, such as any of the isomeric thujaplicins; phenylpropanoid alcohols or phenols, including eugenol, isoeugenol, cinnamyl alcohol, coniferyl alcohol, zingerone, umbelliferone, coumaryl alcohol, and chavicol; or alcohols or phenols produced by the natural plant metabolism of a phenylpropanoid, including vanillin, ethyl vanillin, piperonyl alcohol, or syringaldehyde.

Moreover, O-alkylated and O-acylated monoterpenoids, for example and without limitation etherified monoterpenoids containing carboxylic acid moieties or ester moieties and oligoesters of monoterpenoids containing carboxylic acid moieties are herein referred to as monoterpenoid derivatives.

The term "phenylpropanoid" refers to a diverse group of organic compounds that are synthesized by plants from the amino acid phenylalanine. Their name is derived from the six-carbon, aromatic phenyl group and the three-carbon propene tail of cinnamic acid, which is synthesized from phenylalanine in the first step of phenylpropanoid biosynthesis. Phenylpropanoids are found throughout the plant kingdom, where they serve as essential components of a number of structural polymers, provide protection from ultraviolet light, defend against herbivores and pathogens, and mediate plant-pollinator interactions as floral pigments and scent compounds.

According to one embodiment, the monoterpenoid and/or phenylpropanoid moiety of the compounds of the disclosed embodiments are derived from a biorational source, such as a plant volatile or as a constituent of plant essential oils obtained from the leaf tissue, stem tissue, root tissue, or mixture thereof.

As used herein, the term "alkyl" means an aliphatic hydrocarbon group which may be straight or branched. When not otherwise restricted, the term refers to an alkyl of from 2 to 7 carbons. Exemplary alkyl groups include, for example and without limitation, ethyl, n-propyl, i-propyl, n-butyl, t-butyl, n-pentyl, 3-pentyl, and the like.

The term "alkenyl" means an aliphatic hydrocarbon group containing a carbon-carbon double bond and which may be straight or branched having from 2 to about 7 carbon atoms in the chain. Non-limiting, exemplary alkenyl groups include ethenyl, propenyl, n-butenyl, isoprene, and i-butenyl. The term "alkenyl" may also refer to a hydrocarbon chain having 2 to 7 carbons containing at least one double bond and at least one triple bond.

The term "alkynyl" means an aliphatic hydrocarbon group containing a carbon-carbon triple bond and which may be straight or branched having about 3 to about 7 carbon atoms in the chain. Non-limiting, exemplary alkynyl groups include propynyl, n-butynyl, 2-butynyl, 3-methylbutynyl, propargyl, and n-pentynyl.

The term "cycloalkyl" means a non-aromatic, saturated or unsaturated, mono- or multi-cyclic ring system of about 3 to about 7 carbon atoms. Exemplary cycloalkyl groups include, without limitation, cyclopropyl, cyclobutyl, cyclopentyl, cyclohexyl, and cycloheptyl.

The term "cycloalkenyl" means a non-aromatic, unsaturated, mono- or multi-cyclic ring system of about 3 to about 7 carbon atoms. Exemplary cycloalkenyl groups include, without limitation, cyclopropenyl, cyclobutenyl, cyclopentenyl, cyclohexenyl, and cycloheptenyl.

The term "heteroaryl" means an aromatic monocyclic or multi-cyclic ring system of about 5 to about 19 ring atoms, or about 5 to about 10 ring atoms, in which one or more of the atoms in the ring system is/are element(s) other than carbon, for example, nitrogen, oxygen, or sulfur. In the case of a multi-cyclic ring system, only one of the rings needs to be aromatic for the ring system to be defined as "heteroaryl." Particular heteroaryls contain about 5 to 6 ring atoms. The prefix aza, oxa, thia, or thio before heteroaryl means that at least a nitrogen, oxygen, or sulfur atom, respectively, is present as a ring atom. A nitrogen, carbon, or sulfur atom in the heteroaryl ring may be optionally oxidized; the nitrogen may optionally be quaternized. Suitable heteroaryls include, without limitation, pyridyl, 2-oxo-pyridinyl, pyrimidinyl, pyridazinyl, pyrazinyl, triazinyl, furanyl, pyrrolyl, thiophenyl, pyrazolyl, imidazolyl, oxazolyl, isoxazolyl, thiazolyl, isothiazolyl, triazolyl, oxadiazolyl, thiadiazolyl, tetrazolyl, indolyl, isoindolyl, benzofuranyl, benzothiophenyl, indolinyl, 2-oxoindolinyl, dihydrobenzofuranyl, dihydrobenzothiophenyl, indazolyl, benzimidazolyl, benzooxazolyl, benzothiazolyl, benzoisoxazolyl, benzoisothiazolyl, benzotriazolyl, benzo[1,3]dioxolyl, quinolinyl, isoquinolinyl, quinazolinyl, cinnolinyl, pthalazinyl, quinoxalinyl, 2,3-dihydro-benzo[1,4]dioxinyl, benzo[1,2,3]triazinyl, benzo[1,2,4]triazinyl, 4H-chromenyl, indolizinyl, quinolizinyl, 6aH-thieno[2,3-d]imidazolyl, 1H-pyrrolo[2,3-b]pyridinyl, imidazo[1,2-a]pyridinyl, pyrazolo[1,5-a]pyridinyl, [1,2,4]triazolo[4,3-a]pyridinyl, [1,2,4]triazolo[1,5-a]pyridinyl, thieno[2,3-b]furanyl, thieno[2,3-b]pyridinyl, thieno[3,2-b]pyridinyl, furo[2,3-b]pyridinyl, furo[3,2-b]pyridinyl, thieno[3,2-d]pyrimidinyl, furo[3,2-d]pyrimidinyl, thieno[2,3-b]pyrazinyl, imidazo[1,2-a]pyrazinyl, 5,6,7,8-tetrahydroimidazo[1,2-a]pyrazinyl, 6,7-dihydro-4H-pyrazolo[5,1-c][1,4]oxazinyl, 2-oxo-2,3-dihydrobenzo[d]oxazolyl, 3,3-dimethyl-2-oxoindolinyl, 2-oxo-2,3-dihydro-1H-pyrrolo[2,3-b]pyridinyl, benzo[c][1,2,5]oxadiazolyl, benzo[c][1,2,5]thiadiazolyl, 3,4-dihydro-2H-benzo[b][1,4]oxazinyl, 5,6,7,8-tetrahydro-[1,2,4]triazolo[4,3-a]pyrazinyl, [1,2,4]triazolo[4,3-a]pyrazinyl, 3-oxo-[1,2,4]triazolo[4,3-a]pyridin-2(3H)-yl, and the like.

The term "monocyclic" used herein indicates a molecular structure having one ring.

The term "polycyclic" or "multi-cyclic" used herein indicates a molecular structure having two or more rings, including, but not limited to, fused, bridged, or spiro rings.

The term "halogen" as used herein is intended to include fluorine, bromine, chlorine, and iodine while the term "halide" is intended to include fluoride, bromide, chloride, and iodide anion.

The term "substituted" specifically envisions and allows for one or more substitutions that are common in the art. However, it is generally understood by those skilled in the art that the substituents should be selected so as to not adversely affect the useful characteristics of the compound or adversely interfere with its function. Suitable substituents may include, for example, halogen groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, amino groups, alkyl- and dialkylamino groups, carbamoyl groups, alkylcarbonyl groups, carboxyl groups, alkoxycarbonyl groups, alkylaminocarbonyl groups, dialkylamino carbonyl groups, arylcarbonyl groups, aryloxycarbonyl groups, alkylsulfonyl groups, arylsulfonyl groups, cycloalkyl groups, cyano groups, C1-C6 alkylthio groups, arylthio groups, nitro groups, keto groups, acyl groups, boronate or boronyl groups, phosphate or phosphonyl groups, sulfamyl groups, sulfonyl groups, sulfinyl groups, and combinations thereof. In the case of substituted combinations, such as "substituted arylalkyl," either the aryl or the alkyl group may be substituted, or both the aryl and the alkyl groups may be substituted with one or more substituents. Additionally, in some cases, suitable substituents may combine to form one or more rings as known to those of skill in the art.

According to one embodiment, the compounds are substituted, meaning a group may have a substituent at a substitutable atom of the group (including more than one substituent on a single atom), provided that the designated atom's normal valence is not exceeded and the identity of each substituent is independent of the others. For example, up to three H atoms in each residue are replaced with substituents such as alkyl, halogen, haloalkyl, hydroxy, lower alkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. When a substituent is keto (i.e., =O), then two hydrogens on the atom are replaced. Combinations of substituents and/or variables are permissible only if such combinations result in stable compounds; by "stable compound" it is meant a compound that is sufficiently robust to survive isolation to a useful degree of purity from a reaction mixture, and formulation into an agent intended for a suitable use.

According to certain embodiments, the compounds are unsubstituted. "Unsubstituted" atoms bear all of the hydrogen atoms dictated by their valence.

The term "compound," and equivalent expressions, are meant to embrace compounds as described herein. Also contemplated are salts, oxides, solvates, e.g., hydrates, and inclusion complexes of the compounds, where the context so permits, as well as any stereoisomeric form, or a mixture of any such forms of that compound in any ratio. Inclusion complexes are described in Remington, The Science and Practice of Pharmacy, 19th Ed. 1:176-177 (1995), which is hereby incorporated by reference in its entirety. The most commonly employed inclusion complexes are those with cyclodextrin, and all cyclodextrin complexes, natural and synthetic, are specifically encompassed by the compounds disclosed herein.

Compounds described herein may contain one or more asymmetric centers and may thus give rise to enantiomers, diastereomers, and other stereoisomeric forms. Each chiral center may be defined, in terms of absolute stereochemistry, as (R)- or (S)-. This is meant to include all such possible isomers, as well as mixtures thereof, including racemic and optically pure forms. Optically active (R)- and (S)-, (−)- and (+)-, or (D)- and (L)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

A first aspect of the disclosed embodiments relates to a compound of formula (I):

where
$R_1$ is each independently a phenylpropanoid or monoterpenoid moiety;
L is a polyester-containing linking moiety having a structure

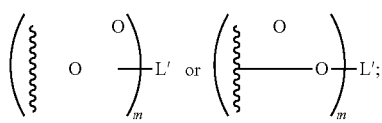

L' is selected from the group consisting of branched or unbranched saturated or unsaturated alkyl or cycloalkyl, aryl, and heteroaryl; and m is from 2-6.

It will be appreciated by a person of ordinary skill in the art that when m is 2, then the compound of formula (I) has a structure

$R_1$-L-$R_1$, and when m is 3, then the compound of formula (I) has a structure

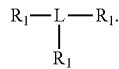

According to one embodiment of this aspect, the compound has a structure of formula (II):

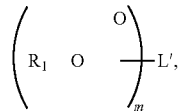
(II)

where
$R_1$ is each independently a phenylpropanoid or monoterpenoid moiety;
L' is selected from the group consisting of branched or unbranched saturated or unsaturated alkyl or cycloalkyl, aryl, and heteroaryl; and
m is from 2-6.

It will be appreciated by a person of ordinary skill in the art that when m is 2, then the compound of formula (II) has a structure

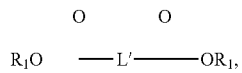

and when m is 3, then the compound of formula (II) has a structure

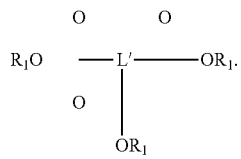

In a specific embodiment, L', together with the ester to which it is bound is:

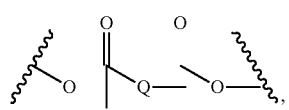

where
Q is selected from the group consisting of branched or unbranched saturated or unsaturated $C_0$-$C_4$ alkyl, branched or unbranched $C_0$-$C_4$ ketone, and branched or unbranched $C_0$-$C_4$ amine.

In a more specific embodiment, Q is —$(CH_2)_n$—, and n is from 0 to 4.

In another more specific embodiment, Q is selected from the group consisting of

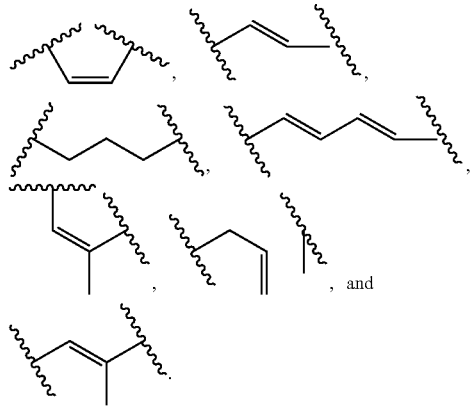
, and

In yet another more specific embodiment, Q is selected from the group consisting of

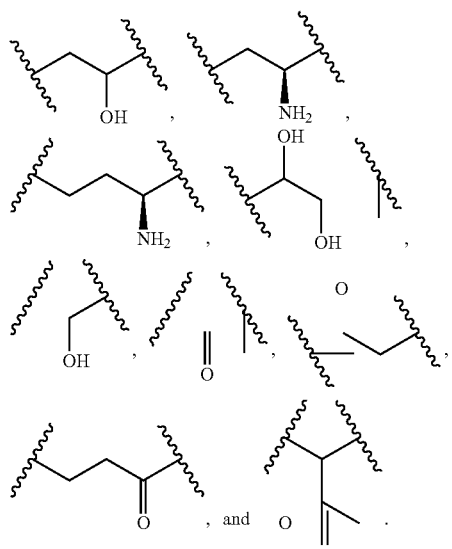
, and

According to one embodiment of the compound of formula (II), at least one $R_1$ is a phenylpropanoid moiety.

According to another embodiment of the compound of formula (II), at least one R1 is a monoterpenoid moiety.

In one specific embodiment, L' is a tricarboxylic acid moiety, and m is 3.

In another specific embodiment, L', together with the ester to which it is bound, is a tricarboxylic acid moiety selected from the group consisting of

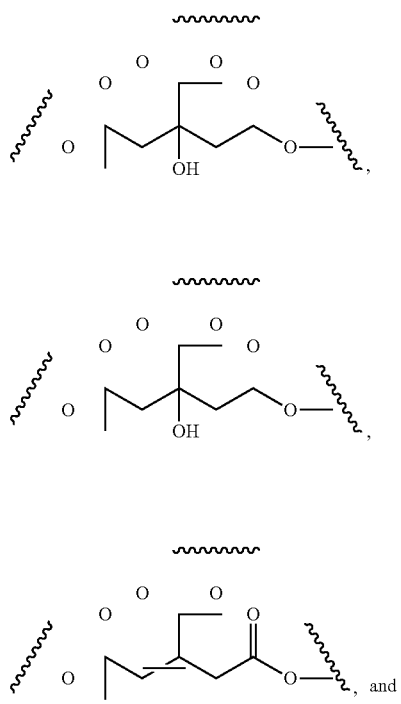

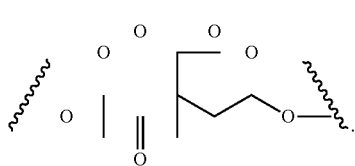

and

According to one embodiment of the compound of formula (II), L', together with the ester to which it is bound, is a polycarboxylic acid moiety, where the number of carboxylic acid moieties is a number greater than m, such that one or more carboxylic acid moieties are non-esterified.

In one specific embodiment, m is 2, L' is a tricarboxylic acid moiety, and the non-esterified carboxylic acid is protonated or is a carboxylate salt. Suitable non-esterified carboxylic acids include, without limitation, a carboxylate salt with a sodium, potassium, calcium, magnesium, iron, zinc, copper, or amine counterion. The non-esterified carboxylic acid may be a carboxylate salt with an amine selected from the group consisting of ammonia, diethylamine, triethylamine, and methylamine.

In another specific embodiment, L', together with the ester to which it is bound, is a carboxylic acid moiety having at least 4 carboxylic acid groups.

In yet another specific embodiment, m is 4-6.

In one embodiment, the one or more non-esterified carboxylic acid moieties are carboxylate salts. Suitable carboxylate salts include, without limitation, a sodium, potassium, calcium, magnesium, iron, zinc, copper, or amine counterion.

In one embodiment of the compound of formula (II), m is 4-6.

Compounds of formula (II) include, without limitation, the specific compounds set forth in the following Table 1.

TABLE 1

Exemplary Compounds of Formula (II)

| Compound Name | Compound Structure |
|---|---|
| 2028 digeranyl succinate | |
| 1029 dicinnamyl adipate | |
| 1031 dithymyl adipate | |

TABLE 1-continued

Exemplary Compounds of Formula (II)

| Compound Name | Compound Structure |
| --- | --- |
| 1049A dithymyl succinate | |
| 1051A dieugenyl succinate | |
| 2284 eugenyl hydrogen succinate | |
| 2285 thymyl hydrogen succinate | |
| 2286 carvacryl hydrogen succinate | |
| 1097 cinnamyl hydrogen succinate | |
| 1098B thymyl hydrogensuccinate | |

TABLE 1-continued

Exemplary Compounds of Formula (II)

| Compound Name | Compound Structure |
|---|---|
| 1049B dimenthyl succinate | 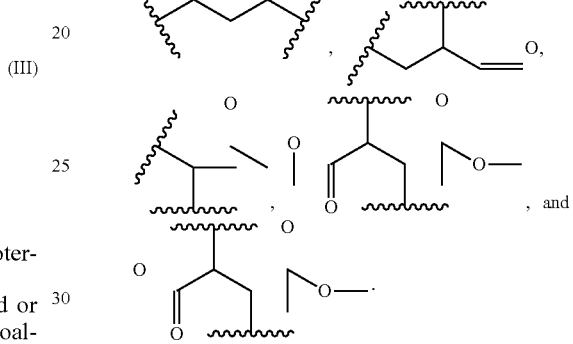 |

According to another embodiment of this aspect, the compound has a structure of formula (III):

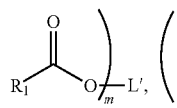

(III)

where
R₁ is each independently a phenylpropanoid or monoterpenoid moiety
L' is selected from the group consisting of branched or unbranched saturated or unsaturated alkyl or cycloalkyl, aryl, and heteroaryl;
X is halogen; and
m is from 2-6.

In a specific embodiment of the compound of formula (III), m is 2.

It will be appreciated by a person of ordinary skill in the art that when m is 2, then the compound of formula (III) has a structure

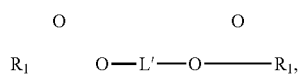

and when m is 3, then the compound of formula (III) has a structure

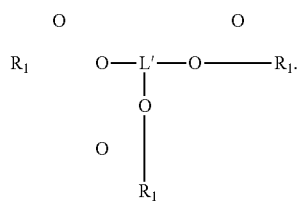

In a more specific embodiment of the compound of formula (III), L' is selected from the group consisting of

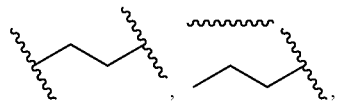

In another specific embodiment of the compound of formula (III), m is 3.

In a more specific embodiment, L' is selected from the group consisting of

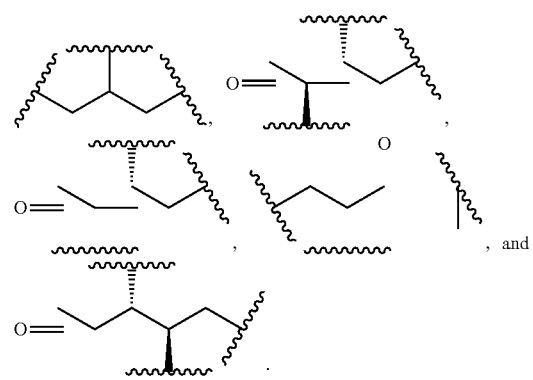

In yet another specific embodiment of the compound of formula (III), L' is a monosaccharide moiety and two or more hydroxyl groups of the monosaccharide moiety that form an ester with R1 are not part of L'.

In a more specific embodiment, the monosaccharide moiety is a pentose selected from the group consisting of arabinose, lyxose, ribose, xylose, ribulose, and xylulose.

In another more specific embodiment, the monosaccharide moiety is a hexose selected from the group consisting of allose, altrose, glucose, mannose, gulose, talose, idose, sorbose, fructose, psicose, and tagatose.

In another specific embodiment of the compound of formula (III), L' is a disaccharide moiety, and hydroxyl groups of the disaccharide moiety that form an ester with R1 are not part of L'.

In a more specific embodiment, the disaccharide moiety is selected from the group consisting of sucrose, maltose, and lactose.

In a specific embodiment of the compound of formula (III), L' is a sugar alcohol moiety, and hydroxyl groups of the sugar alcohol moiety that form an ester with R1 are not part of L'.

In a more specific embodiment, the sugar alcohol is selected from the group consisting of sorbitol, inositol, erythritol, ribitol, threitol, arabitol, and xylitol.

In a specific embodiment of the compound of formula (III), at least one R1 is an acyclic monoterpenoid moiety selected from the group consisting of

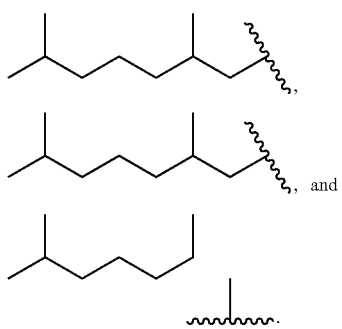

In a specific embodiment of the compound of formula (III), at least one $R_1$ is a mono- or bicyclic monoterpenoid moiety selected from the group consisting of

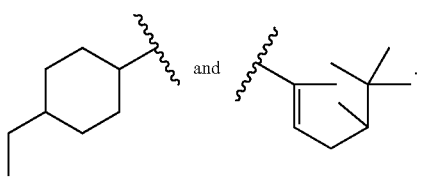

In a specific embodiment of the compound of formula (III), at least one $R_1$ has the following structure:

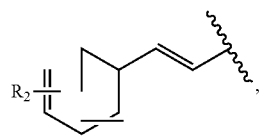

where $R_2$ is H, OH, OMe, or OEt.

In a specific embodiment of the compound of formula (III), at least one $R_1$ has the following structure:

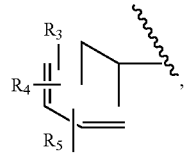

where
$R_3$ is OH, OMe, or OEt;
$R_4$ is H, OH, or OMe; and
$R_5$ is H, OH, or OMe.

In a more specific embodiment, at least one $R_1$ is selected from the group consisting of

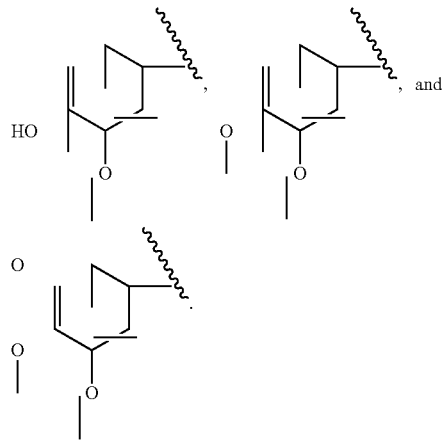

Compounds of formula (III), without limitation, the specific compounds set forth in the following Table 2.

TABLE 2

Exemplary Compounds of Formula (III)

| Compound Name | Compound Structure |
|---|---|
| 1025 Ethylene dicitronellate | |
| 1026 ethylene dicinnamate | |

TABLE 2-continued
Exemplary Compounds of Formula (III)
| Compound Name | Compound Structure |
|---|---|
| 1027 hexacitronelloylinositol | 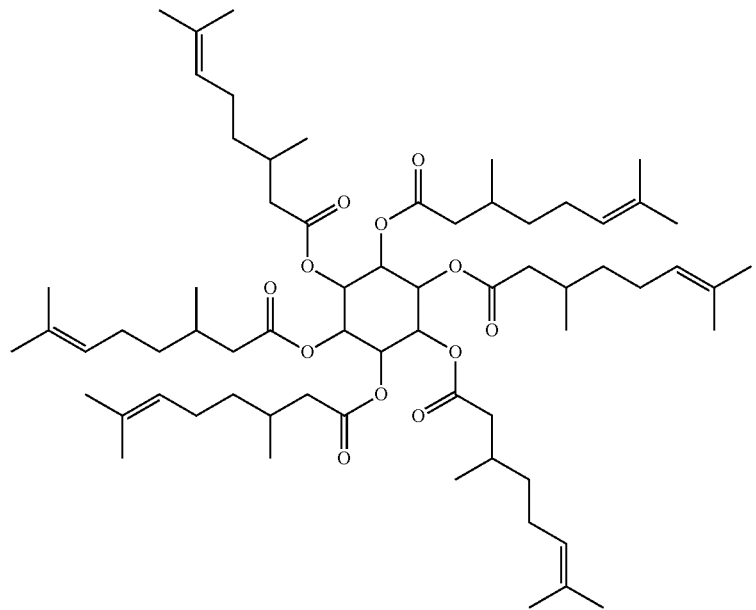 [SMILES: CC(C)=CCCC(C)CC(=O)OC1C(OC(=O)CC(C)CCC=C(C)C)C(OC(=O)CC(C)CCC=C(C)C)C(OC(=O)CC(C)CCC=C(C)C)C(OC(=O)CC(C)CCC=C(C)C)C1OC(=O)CC(C)CCC=C(C)C] |
| 1032A tricinnamoylglycerol | 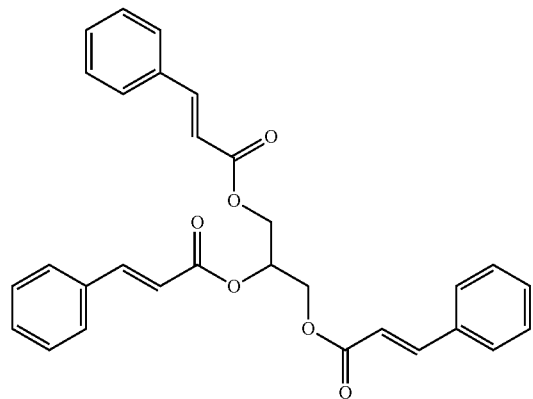 [SMILES: O=C(/C=C/c1ccccc1)OCC(COC(=O)/C=C/c1ccccc1)OC(=O)/C=C/c1ccccc1] |
| 1063A dicitronelloylhydroquinone | 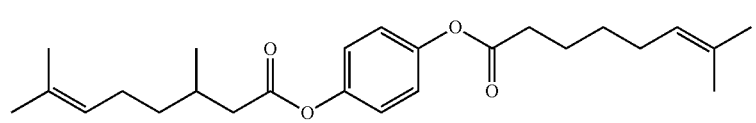 [SMILES: CC(C)=CCCCCC(=O)Oc1ccc(OC(=O)CC(C)CCC=C(C)C)cc1] |

TABLE 2-continued

Exemplary Compounds of Formula (III)

| Compound Name | Compound Structure |
|---|---|
| 1032B hexacinnamoylinositol | |
| 1044F1 tricitronelloylglycerol | |
| 1044F2 dicitronelloylglycerol | |

Another aspect of the disclosed embodiments relates to a compound of formula (IV):

$$R_1\text{-}A, \quad (IV)$$

where

A is —O—$R_2$,

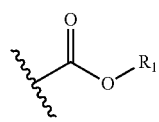

$R_1$ is a phenylpropanoid or monoterpenoid moiety;

$R_2$ is a phenylpropanoid or monoterpenoid moiety or is selected from the group consisting M, substituted or unsubstituted $C_3$-$C_7$ unbranched or branched alkyl, substituted or unsubstituted $C_2$-$C_7$ unbranched or branched alkenyl, substituted or unsubstituted $C_3$-$C_7$ unbranched or branched alkynyl, substituted or unsubstituted $C_3$-$C_7$ unbranched or branched cycloalkyl, substituted or unsubstituted heteroaryl, and substituted or unsubstituted $C_3$-$C_7$ unbranched or branched cycloalkenyl; and M is a counterion selected from the group consisting of sodium, potassium, calcium, magnesium, iron, zinc, copper, and an amine;

and when A is

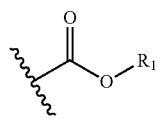

then the compound is not

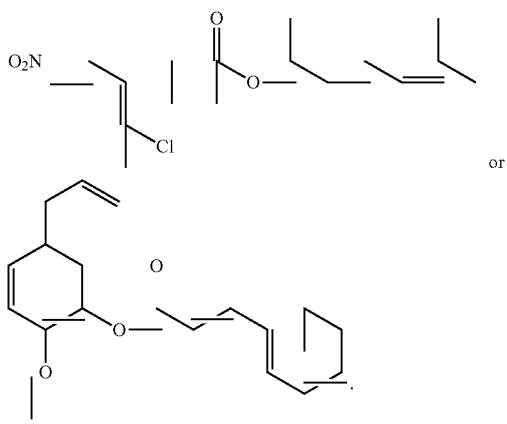

or

In another embodiment of the compound of formula (IV), A is

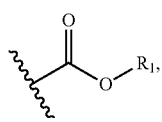

$R_1$ is selected from the group consisting of substituted or unsubstituted $C_7$-$C_{15}$ unbranched or branched alkyl, substituted or unsubstituted $C_7$-$C_{15}$ unbranched or branched alkenyl, substituted or unsubstituted $C_7$-$C_{15}$ unbranched or branched alkynyl, substituted or unsubstituted $C_7$-$C_{15}$ unbranched or branched cycloalkyl, substituted or unsubstituted heteroaryl, and substituted or unsubstituted $C_7$-$C_{15}$ unbranched or branched cycloalkenyl In another embodiment of the compound of formula (IV), R1 is a phenylpropanoid moiety.

In yet another embodiment of the compound of formula (IV), R1 is a monoterpenoid moiety.

In a more specific embodiment, the monoterpenoid moiety is selected from the group consisting of

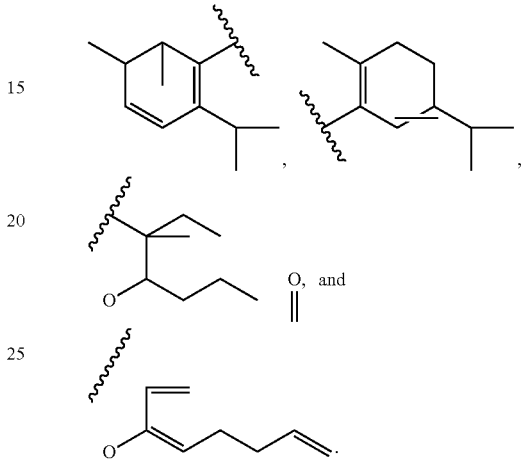

In another embodiment of the compound of formula (IV), R1 is selected from the group consisting of methyl, ethyl, isopropyl, propyl, isobutyl, butyl, and tert-butyl.

Compounds of formula (IV) include, without limitation, the specific compounds set forth in the following Table 3.

TABLE 3

| Compound Name | Compound Structure |
|---|---|
| 1087 cinnamyl citronellyl ether | |
| 1055C citronellyl citronellate | |
| 1053 piperonyl citronellate | |
| 1060A thymyl citronellate | |

TABLE 3-continued

| Compound Name | Compound Structure |
|---|---|
| 1062A eugenyl citronellate | |
| 1077A thymyl cinnamate | |
| 1079B carvacryl citronellate | |
| 1085A citronellyl myristate | |
| 1085B citronellyl myristate | |
| 1085C menthyl myristate | |

Another aspect of the disclosed embodiments relates to a compound of formula (V):

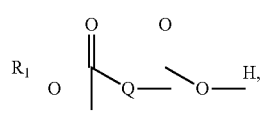

where
  $R_1$ is a phenylpropanoid or monoterpenoid moiety and
  Q is selected from the group consisting of branched or unbranched saturated or unsaturated $C_0$-$C_4$ alkyl, branched or unbranched $C_0$-$C_4$ ketone, and branched or unbranched $C_0$-$C_4$ amine.

In one embodiment, Q is —(CH2)n-, and n is from 0 to 4.

In another embodiment, Q is selected from the group consisting of

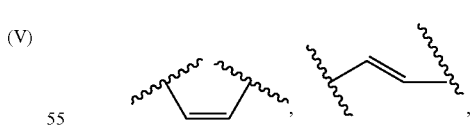

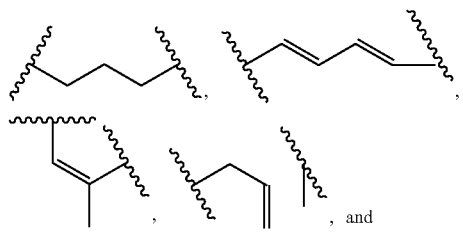

, and

-continued

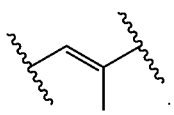

In yet another embodiment, Q is selected from the group consisting of

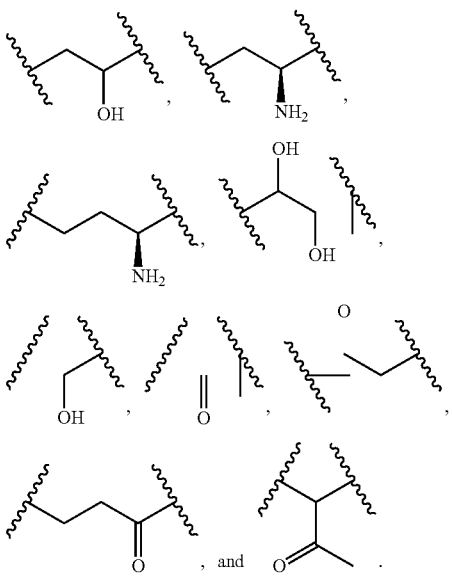

A further aspect of the disclosed embodiments relates to a method of making a compound having a structure of formula (II):

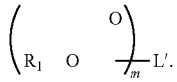
(II)

This method involves
reacting $R_1$—OH with

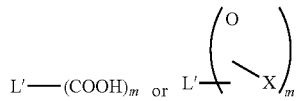

$R_1$—OH with
under conditions effective to form a compound having a structure of formula (II), where $R_1$ is
- each independently a monoterpenoid or phenylpropanoid moiety;
- L' is selected from the group consisting of branched or unbranched saturated or unsaturated alkyl or cycloalkyl, aryl, and heteroaryl;
- X is halogen; and m is from 2-6.

In one embodiment, this method involves reacting two or more equivalents of
$R_1$—OH with L'-(COOH)$_m$ or
two or more equivalents of m

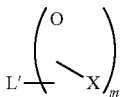

under conditions effective to form a compound having a structure of formula (II).

Another aspect of the disclosed embodiments relates to a method of making a compound having a structure of formula (III):

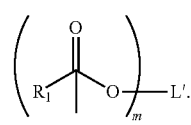
(III)

This method involves
reacting $R_1$—COOH with L'-(OH)$_m$
or

with L'-(OH)$_m$
under conditions effective to form a compound having the structure of

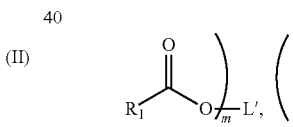

where
- $R_1$ is each independently a phenylpropanoid or monoterpenoid moiety;
- L' is selected from the group consisting of branched or unbranched saturated or unsaturated alkyl or cycloalkyl, aryl, and heteroaryl; and
- m is from 2-6.

In one embodiment, this method involves reacting
two or more equivalents of $R_1$—COOH with L'-(OH)$_m$ or
two or more equivalents of

with L'-(OH)$_m$
under conditions effective to form a compound having a structure of formula (III).

As noted supra, the certain example compounds may be derived from a biorational source, such as a plant volatile or as a constituent of plant essential oils obtained from the leaf tissue, stem tissue, root tissue, or mixture thereof.

In another embodiment, the monoterpenoids used for synthesis to obtain a higher molecular weight, higher polarity, or decreased volatility are obtained from a synthetic source.

As noted supra, certain compounds are derivatives of monoterpenoids or phenylpropanoids. By way of a non-limiting example, a compound of the present disclosure may be a derivative of an alcohol-containing monoterpenoid or phenylpropanoid, such as, e.g., thymol

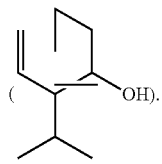

In one example embodiment, a thymol-derivative has the structure

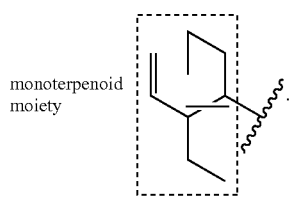

where the 10-carbon skeleton of thymol makes up the monoterpenoid or monoterpenoid moiety (e.g., $R_1$ of formula (I)), and the wavy line, represents the linkage to the rest of the molecule (e.g., L of formula (I)).

By way of another non-limiting example, a compound may be a derivative of a carboxylic acid-containing monoterpenoid or phenylpropanoid, such as, e.g., citronellic acid

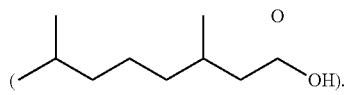

In another example embodiment, a citronellic acid derivative has the structure

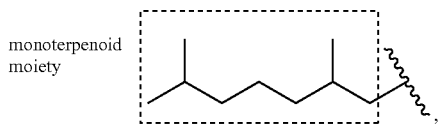

where the 9-carbon skeleton of citronellic acid (excluding the carboxylic acid carbon) makes up the monoterpenoid or monoterpenoid moiety and the wavy line, represents the linkage to the rest of the molecule (e.g., L of Formula (I)). Thus, the ester direction (i.e., whether L is or

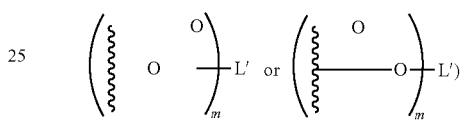

is dictated by the monoterpenoid or phenylpropanoid precursor (e.g., thymol or citronellic acid) used herein.

Thus, the example compounds may be derived from monoterpenoid alcohols (i.e., monoterpenoids containing a hydroxyl group) or from monoterpenoid carboxylic acids (i.e., monoterpenoids containing a carboxylic acid). Alternatively, the compounds may be derived from phenylpropanoid alcohols (i.e., phenylpropanoids containing a hydroxyl group) or from phenylpropanoid carboxylic acids (i.e., phenylpropanoids containing a carboxylic acid).

A further aspect of the disclosed embodiments relates to an insecticidal seed treatment composition comprising the compounds of formula (V) and a carrier. Compounds of formula (V) include, without limitation, the specific compounds set forth in the following Table 5.

TABLE 5

| Compound Name | Compound Structure |
|---|---|
| 2284 eugenyl hydrogen succinate | |
| 2285 thymyl hydrogen succinate | |

TABLE 5-continued

| Compound Name | Compound Structure |
|---|---|
| 2286 carvacryl hydrogen succinate | |
| 1097 cinnamyl hydrogensuccinate | |
| 1098B thymyl hydrogensuccinate | |

In a specific embodiment, suitable esters include, without limitation, methyl, ethyl, propyl, isopropyl, butyl, isobutyl, sec-butyl, tert-butyl, amyl esters.

In another specific embodiment, suitable carboxylate salts include, without limitation, metal salts, including sodium, potassium, calcium, and magnesium.

Another aspect of the disclosed embodiments relates to an insecticidal composition comprising a compound of formula (I), (II), (III), (IV), or (V) and a carrier.

Other disclosed embodiments relate to seed treatments designed to kill or repel insects that feed on root tissue of a plant that is valued, including but not limited to systemic action through the plant tissue itself.

It has been determined that many monoterpenoids are toxic if topically applied to insects, injected, or applied to a surface in which insects will come in contact. Unfortunately, many of these compounds are far too repellent to be included in attractive baits or seed treatments. By decreasing the volatility of these molecules by means of increasing the molecular weight or polarity of these relatively volatile compounds by synthetic chemistry processes, there may be potential for these compounds to become less repellent, encouraging ingestion by various pest insects. Once ingested, these compounds (through hydrolysis of the ester bond, according to one embodiment) are toxic and/or repellent. These compounds provide a biorational alternative to many of the currently available toxic bait and/or seed treatment formulations on the market, which primarily contain synthetic insecticides.

Monoterpenoid derivative compounds of the disclosed embodiments have an increased molecular weight, higher polarity, or decreased volatility than currently available naturally/synthetically-derived monoterpenoid compounds that have been demonstrated to be insecticidal when combined with various insect diets in laboratory testing. These novel monoterpenoid derivative compounds can effectively kill and repel insect pests when presented in a formulated as a seed treatment where the insect will come in contact with or feed upon these compounds as they feed on adjacent root tissue.

In the insecticidal compositions, the concentration of the toxic compound may be included in the composition in an amount of about 0.01% w/w up to about 1%, 2%, 3%, 4%, 5%, 10%, 15%, 20%, 30%, 40%, or about 50% w/w or more of the composition, and all subranges there between.

Target pests for killing with the insecticidal compositions applied to seeds include phytophagous pests that could damage economically valuable crops.

By "insect" it is meant not only the classical definition of small invertebrate animals having three clearly defined body segments, including head, thorax, and abdomen, with only three pair of legs, and sometimes with wings, such as beetles, bugs, bees, flies, mosquitoes, and the like, but also encompasses other allied classes of arthropods or other invertebrate pests whose members are wingless and usually have greater or fewer than six legs, for example, spiders, ticks, centipedes, wood lice, nematodes, and the like.

A further aspect of the disclosed embodiments relates to a seed treatment composition comprising a compound disclosed herein (unless toxic to a plant seed) and a carrier.

The composition according to this aspect of the disclosed embodiments may be formulated into any suitable seed treatment form including, without limitation, a solution, suspension, foam, paste, or slurry. In one particular embodiment, the composition is formulated in a manner suitable for large or small scale agricultural and horticultural applications.

These formulations are produced in a known manner, for example, by mixing a liquid composition with extenders, i.e., liquid solvents, liquefied gases under pressure, and/or solid carriers. Wetting agents and/or surfactants, that is, emulsifiers and/or dispersants, sequestering agents, plasticizers, brighteners, flow agents, coalescing agents, waxes, fillers, polymers, anti-freezing agents, biocides, thickeners, tackifiers, and/or foam formers and defoaming agents may also be used in manners commonly known by those of ordinary skill in the art. If the extender used is water, it is also possible to employ, for example, organic solvents as auxiliary solvents. Other possible additives are mineral and vegetable oils, colorants such as inorganic pigments, and trace nutrients.

Example embodiments include pesticidal formulations where the compounds disclosed herein are encapsulated. The expression "encapsulated" or "encapsulation" or any lingual variation thereof refers herein to a granule of any shape and size, which is capable of holding therein one or more compounds disclosed herein. One non-limiting example of such encapsulation is microencapsulation. The suitable microcapsule is one having from 30 to 98% or more of its weight a compound disclosed herein and may be prepared by, for example, interfacial polymerization of isocyanates or other suitable encapsulating material to afford a microencapsulating shell. Such a microcapsule may have an average size of between 0.1 and 1,000 microns.

The nature and action of such additives are well-known to those of ordinary skill in the art of liquid formulations. Additives should not interfere with the compound or any other biologically active component included in the formulation.

In one embodiment, the active compound content of the formulation is in a concentration of active compound from about 0.0000001 to 20% by weight, or from about 0.0001 to 15% by weight.

In one embodiment, the seed coating composition is combined with effective amounts of other agricultural or horticultural chemicals, such as insecticides, acaricides, nematicides, molluscicides, attractants, sterilants, bactericides, acaricides, nematicides, fungicides, and/or growth regulators.

A variety of fungicides may be used. They include, for example, those classified and listed by the Fungicide Resistance Action Committee (FRAC), FRAC CODE LIST 1: Fungicides sorted by FRAC Code, December 2006, which is hereby incorporated by reference in its entirety. A summary of this list includes: Methyl benzimidazole carbamates (MBC): e.g., benzimidazoles and thiophanates; Dicarboximides; Demethylation inhibitors (DMI) (SBI: Class I): e.g., imidazoles, piperazines, pyridines, pyrimidines, and triazoles; Phenylamides (PA): e.g., acylalanines, oxazolidinones, and butyrolactones; Amines (SBI: Class II): e.g., morpholines, piperidines, and spiroketalamines; Phosphoro-thiolates and Dithiolanes; Carboxamides: e.g., benzamides, furan carboxamides, oxathiin carboxamides, thiazole carboxamides, pyrazole carboxamides, and pyridine carboxamides; Hydroxy-(2-amino-) pyrimidines; Anilino-pyrimidines (AP); N-phenyl carbamates; Quinone outside inhibitors (QoI): e.g., methoxyacrylates, methoxy-carbamates, oximino acetates, oximino-acetamides, oxazolidine-diones, dihydro-dioxazines, imidazolinones, and benzyl-carbamates; Phenylpyrroles; Quinolines; Aromatic hydrocarbons (AH) and Heteroaromatics I: e.g., 1,2,4-thiadiazoles; Cinnamic acids; Melanin biosynthesis inhibitors-reductase (MBI-R): e.g., isobenzofuranone, pyrroloquinolinone, and triazolobenzo-thiazole; Melanin biosynthesis inhibitors-dehydratase (MBI-D): e.g., cyclopropane-carboxamide, carboxamide, and propionamide; Hydroxyanilides (SBI: Class III); Hydroxyanilides (SBI: Class IV): e.g., thiocarbamates and allylamines; Polyoxins: e.g., peptidyl pyrimidine nucleoside; Phenylureas; Quinone inside inhibitors (Qil): e.g., cyanoimidazole and sulfamoyl-triazoles; Benzamides: e.g., toluamides; Antibiotics: e.g., enopyranuronic acid, hexopyranosyl, streptomycin, and validamycin; Cyanoacetamide-oximes; Carbamates; Dinitrophenyl crotonates; Pyrimidinone-hydrazones; 2,6-dinitro-anilines; Organo tin compounds: e.g., tri phenyl tin compounds; Carboxylic acids; Heteroaromatics II: e.g., isoxazoles and isothiazolones; Phosphonates: e.g., ethyl phosphonates and phosphorous acid and salts; Phthalamic acids; Benzotriazines; Benzene-sulfonamides; Pyridazinones; Thiophene-carboxamides; Pyrimidinamides; CAA-fungicides (Carboxylic Acid Amides): e.g., cinnamic acid amides, valinamide carbamates and mandelic acid amides; Tetracycline; Thiocarbamate; Benzamides: e.g., acylpicolides; Host plant defense inducers: e.g., benzo-thiadiazole BTH, benzisothiazole and thiadiazole-carboxamides; Unclassified materials: e.g., thiazole carboxamide, phenyl-acetamide, quinazolinone, and benzophenone; Multi-site contact materials: e.g., copper salts, sulfur, dithiocarbamates and relatives, phthalimides, chloronitriles (phthalonitriles), sulphamides, guanidines, triazines, and quinones (anthraquinones); Non-classified materials: e.g., mineral oils, organic oils, potassium bicarbonate, and biological materials. Those skilled in the art will recognize that other fungicides may be formulated or co-administered with various example embodiments disclosed herein.

In one embodiment, the composition is microencapsulated in a polymeric substance. Examples of suitable microencapsulation materials include the following classes of materials for which representative members are provided. It will be apparent to those skilled in the art that other classes of materials with polymeric properties may be used and that other materials within each given class and others polymeric classes may be used for microencapsulation. In this description, microencapsulation is taken to include methods and materials for nano-encapsulation. Examples include but are not limited to: gums and natural macromolecules: such as, gum arabic, agar, sodium alginate, carrageenan, and gelatin; carbohydrates: such as, starch, dextran, sucrose, corn syrup, and β-cyclodextrin; celluloses and semisynthetic macromolecules: such as, carboxymethylcellulose, methycellulose, ethylcellulose, nitrocellulose, acetylcellulose, cellulose acetate-phthalate, cellulose acetate-butylate-phthalate, epoxy, and polyester; lipids: such as wax, paraffin, stearic acid, monoglycerides, phospholipids, diglycerides, beeswax, oils, fats, hardened oils, and lecithin; inorganic materials: such as, calcium sulfate, silicates, and clays; proteins: such as, gluten, casein, gelatin, and albumin; biological materials: such as, voided cells from organisms like baker's yeast and other microorganisms together with other formerly living cell tissues. Furthermore, these materials may be used singly or compounded in the processes of micro- or nano-encapsulation.

A further aspect of the disclosed embodiments relates to a plant seed comprising the seed treatment composition on its exterior surface.

Although some embodiments have been depicted and described in detail herein, it will be apparent to those skilled in the relevant art that various modifications, additions, substitutions, and the like are considered to be within the scope of the disclosed embodiments as defined in the following claims.

It will be understood by all readers of this written description that the example embodiments described herein and claimed hereafter may be suitably practiced in the absence of any recited feature, element or step that is, or is not, specifically disclosed herein. For instance, references in this written description to "one embodiment," "an embodiment," "an example embodiment," and the like, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one of ordinary skill in the art to affect such feature, structure, or characteristic in connection with other embodiments whether or not explicitly described.

All publications and references cited herein, including those in the Background section, are expressly incorporated herein by reference in their entirety. However, if there are any differences between any similar or identical terms found an incorporated publication or reference and those explicitly put forth or defined in this written description, then those terms definitions or meanings explicitly put forth in this written description shall control in all respects. Further, any reference to prior art in this specification is not, and should not be taken as, an acknowledgment or any form of suggestion that such prior art forms part of the common general knowledge in any country.

EXAMPLES

The following examples are provided to illustrate embodiments but they are by no means intended to limit its scope.

Example 1—Chemical Synthesis (Representative Examples)

Diesters, Ethylene Glycol Linker

Ethylene glycol (10 mmol) was dissolved in 50 mL DMF, and DMAP (122 mg, 0.1 eq) and DCC (4.54 g, 2.2 eq) were added. The carboxylic acid (25 mmol) was then added as a solution in chloroform (25 mL) over 5 minutes at 0° C. The reaction was allowed to warm back to room temperature, and was stirred for 3 hours. Water (50 mL) and hexane (50 mL) were then added, and the biphasic mixture was then filtered to remove the bulk of the DCU. The mixture was then separated into organic and aqueous layers, and the aqueous layer was extracted twice more with hexane. The organic layers were combined and washed with water several times to remove all DMF, and then rinsed with 1M hydrochloric acid, followed by 1M sodium hydroxide, and then brine, followed by drying over magnesium sulfate. After removal of solvent by rotary evaporation, the compound was purified by column chromatography or recrystallization. 70-90% yield was achieved.

Ethylene Dicinnamate

Cinnamic acid was used. The crude material was recrystallized from isopropanol to give a fluffy white solid (2.88 g, 89%). $^1$H NMR (400 MHz, CDCl$_3$) δ 7.73 (d, J =16.0 Hz, 1H), 7.50 (m, 2H), 7.39 (p, J=3.3, 2.8 Hz, 4H), 6.49 (d, J=16.0 Hz, 1H), 4.50 (s, 2H).

Diesters, Dicarboxylic Acid Linker

Digeranyl Succinate

Succinic acid (0.590 g, 5 mmol) was dissolved in 20 mL DMF, and DMAP (122 mg, 1 mmol) and alcohol (1.62 g, 10.5 mmol) were added and the solution was cooled to 0° C. DCC (2.17 g, 2.1 eq) was dissolved in chloroform (10 mL) and this solution was then added to the reaction mixture over 5 minutes. The reaction was allowed to warm back to room temperature, and was stirred for 3 hours. Water (50 mL) and hexane (50 mL) were then added, and the biphasic mixture was then filtered to remove the bulk of the DCU. The mixture was then separated into organic and aqueous layers, and the aqueous layer was extracted twice more with hexane. The organic layers were combined and washed with water several times to remove all DMF, and then rinsed with 1M hydrochloric acid, followed by 1M sodium hydroxide, and then brine, followed by drying over magnesium sulfate. After removal of solvent by rotary evaporation, the compound was purified by column chromatography to yield a colorless oil. (0.985 g, 50%). $^1$HNMR (400 MHz, CDCl3) δ 5.33 (t, 1H), 5.07 (t, 1H), 4.61 (d, 2H), 2.62 (s, 4H), 2.12-2.02 (mult, 4H), 1.69 (s, 3H), 1.68 (s, 3H), 1.60 (t, 3H). $^{13}$CNMR (101 MHz, CDCl3) δ 172.31, 142.33, 131.81, 123.70, 118.11, 61.62, 39.51, 29.21, 26.27, 25.66, 17.67, 16.45.

Dieugenyl Succinate

Eugenol (3.45 g, 21 mmol) was dissolved in dichloromethane (40 mL) and cooled to 0° C. Pyridine (2.37 g, 30 mmol) was added, followed by the dropwise addition of succinyl chloride (1.55 g, 10 mmol). After the addition was complete, the reaction was allowed to warm to room temperature, stirred for 15 minutes, and then the reaction was diluted with hexane (100 mL), and water (30 mL) was added. The aqueous layer was removed, and the organic layer was washed with water, then 3M hydrochloric acid, and then 2M sodium hydroxide solution several times to remove most of the color from the organic layer. The organic solution was dried over sodium sulfate, and the solvent was removed under reduced pressure. The crude solid was recrystallized from 95% ethanol to give a light yellow solid. $^1$HNMR (400 MHz, CDCl3) δ 6.96 (dd, 2H), 6.79 (d, 2H), 6.76 (d, 2H), 5.96 (ddt, 2H), 5.12 (dq, 2H), 5.08 (ddt, 2H), 3.80 (s, 61H), 3.38 (d, 4H), 3.04 (s, 4H). $^{13}$CNMR (101 MHz, CDCl3) δ 170.39, 150.79, 139.03, 137.89, 137.03, 122.51, 120.64, 116.14, 112.69, 55.81, 40.08, 29.12.

Oligoesters of Polyols, General Procedure

The polyol (5 mmol) was dissolved in DMF (50 mL), and DCC (1.1 eq. per hydroxyl group) and DMAP (0.1 eq. per hydroxyl group) were added. The solution was cooled 0° C., and carboxylic acid (1.15 eq. per hydroxyl group) was added over 10 minutes. Water (50 mL) and hexane (50 mL) were then added, and the biphasic mixture was then filtered to remove the bulk of the DCU. The mixture was then separated into organic and aqueous layers, and the aqueous layer is extracted twice more with hexane. The organic layers were combined and washed with water several times to remove all DMF, and then rinsed with 1M hydrochloric acid, followed by 1M sodium hydroxide, and then brine, followed by drying over magnesium sulfate. After removal of solvent by rotary evaporation, the compound was purified by column chromatography or recrystallization. For glycerol, the triglyceride is often accompanied with the 1,3-diglyceride, which was easily separated. This trend continued with more alcohol groups; additionally, when a sugar was used as the core, different anomers of the sugar occur.

Tricitronelloylglycerol

General procedure with glycerol and citronellic acid. Colorless oil (1.89 g, 69%). $^1$HNMR (400 MHz, CDCl3) δ 5.21 (p, J=4.6 Hz, 1H), 5.01 (overlapping t, 3H), 4.24 (dtd, J=11.6, 4.6, 2.0 Hz, 2H), 4.08 (dtd, J=11.6, 4.6, 2.0 Hz, 2H), 2.26 (overlapping q, 3H), 2.06 (overlapping q, 3H), 2.00-

1.83 (mult, 12H), 1.61 (s, 9H), 1.53 (s, 9H), 1.34-1.10 (overlapping m, 6H), 0.88 (d, 3H), 0.87 (d, 6H).

1,3-Dicitronelloylglycerol

Diacylglycerol isolated from tricitronelloylglycerol synthesis. Colorless oil that solidifies to a white solid (1.89 g, 69%). $^1$HNMR (400 MHz, CDCl3) δ 6.95 (broad s, 1H), 5.09 (t, 2H), 4.30-4.11 (m, 1H), 3.97-3.88 (m, 2H), (3.73-3.63) (m, 2H), 2.41 (dd, 2H), 2.20 (dd, 2H), 2.10-1.71 (mult, 8H), 1.67 (s, 6H), 1.59 (s, 6H), 1.40-1.12 (m, 4H), 0.94 (d, 6H).

Example 2—Western Corn Rootworm Survival Assay

Material and Methods

Corn Seeds

Corn seeds obtained were untreated and did not contain any form of pesticide coating. Corn seeds used were a non-transgenic type strain of corn to prevent confounding results. Germination typically occurred between 2-4 days after moistening.

Seed Coating (Solid Compounds)

Seed coating was accomplished by placing 20 g of corn seeds or soybeans into a container with approximately 1 mL of a 1:5 Elmer's Glue®:water solution with a small amount of Triton-X 100® present (100 μL/5 mL). For solid compounds, 0.25 g of compound was subsequently introduced into the container. This mixture of seeds, Elmer's Glue/water/Triton-X 100 solution, and active compound was mixed thoroughly until seeds were coated with the active ingredient.

Seed Coating (Liquid Compounds)

For each treatment, 0.25 g of liquid compound was dissolved in 5 mL of hexane. 0.25 g of Hi-Sil 233 silica gel was introduced into this mixture of hexane and active ingredient. The solvent was blown-off using a rotary evaporator, allowing for the compound to adsorb to the silica gel. This 0.5 g of silca gel:active ingredient was then used as the solid material used for coating the seeds. The seeds were then coated with the same method used for solid compound.

Western Corn Rootworm Survival Assay

Three corn seeds coated in one type of active monoterpenoid derivative treatment were germinated in small, 2-oz. Solo® condiment cups with lids. Germination of seeds was performed by carefully applying 500 μL of de-ionized water in order to fully surround each seed with water at the bottom of the cup. Parafilm® wax was placed over the top of the cup to maintain moisture and encourage germination of the seeds. Cups containing moistened seeds were allowed to germinate in the dark for 3 days before the start of the assay. Six live neonatal Western corn rootworm larvae were carefully applied to the roots of germinated corn seeds for each cup. After applying the larvae to the roots, 30 g of dried soil, sieved with a 600-μm Fisher Brand sieve and moistened with 4.5 mL of water, was applied evenly throughout the cup. Organza was placed over the top of the cup and fastened in place with a cup lid. Cups were incubated at 28° C. in 40-50% humidity for 7 days. Surviving corn rootworm were enumerated and the average percentage survival was reported. A minimum of 10 replicates were performed for each treatment.

Western Corn Rootworm Development Assay

Surviving rootworm from the "Western Corn Rootworm Survival Assay" defined prior were isolated for further examination. Using head capsule size according to the method highlighted in previous academic reports, we quantified the number of larvae in each instar stage for each chemical exposure group. A t-test comparison was performed at the second instar stage for larvae present in the compound group compared to the control (no treatment) group.

Results

Figure 1:
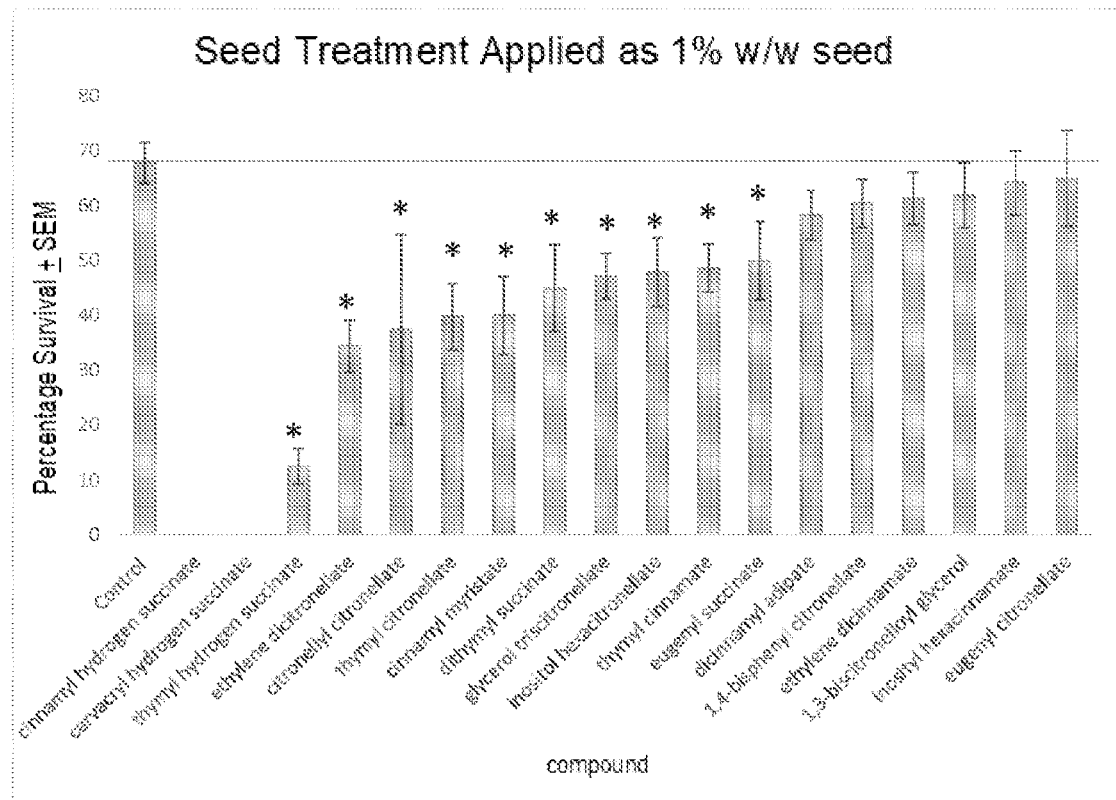
FIG. 1 is a graph demonstrating the efficacy of various monoterpenoid derivatives as seed treatments. These compounds are capable of killing western corn rootworm when corn seeds are treated with these various compounds.

A majority of compounds tested demonstrated their efficacy as active ingredients in seed treatment formulations. FIG. 1 demonstrates the success of numerous compounds tested as potential insecticidal seed treatments. Significantly lower survival of western corn rootworm larvae was observed in many of the treatments compared to the silica-only coated corn seeds. Moreover, the control survival was 67.8±3.7%, which demonstrates that this assay is robust and capable of assessing whether or not compounds act as insecticidal agents when applied to seeds. Of the compounds screened, cinnamyl hydrogen succinate, carvacryl hydrogen succinate, thymyl hydrogen succinate, ethylene dicitronellate, citronellyl citronellate, thymyl citronellate, cinnamyl myristate, dithymyl succinate, glycerol triscitronellate, inositol hexacitronellate, thymyl cinnamate, and eugenyl succinate all caused significantly lower larval survival than the control (α=0.05). Some of the most successful esters were somewhat herbicidal (data not shown), so mortality could be caused by the lack of available root tissue on which the western corn rootworm could feed. The wide range in efficacy of these compounds when applied as 1% weight/weight seeds demonstrates the potential of many of these compounds to be viable coatings (i.e., seed treatments, etc.) that are capable of protecting germinating seeds.

Development of the larvae were also assessed after exposure to seeds treated with these various compounds. Notable differences in the development of larvae were observed compared to the control group. This indicates that these compounds may have insect growth modulatory capacity as well.

Example 3—Western Corn Rootworm Repellency Assay

Material and Methods

Corn Seeds

Corn seeds obtained were untreated and did not contain any form of pesticide coating. Corn seeds used were a non-transgenic type strain of corn to prevent confounding results. Germination typically occurred between 2-4 days after moistening.

Seed Coating (Solid Compounds)

Seed coating was accomplished by placing 20 g of corn seeds or soybeans into a container with approximately 1 mL of a 1:5 Elmer's Glue:water solution (or other adhesive material plus water) with a small amount of Triton-X 100 present 100 µL/5 mL). For solid compounds, 0.25 g of compound was subsequently introduced into the container. This mixture of seeds, Elmer's Glue/water/Triton-X 100 solution, and active compound was mixed thoroughly until seeds were coated with the active ingredient.

Seed Coating (Liquid Compounds)

For each treatment, 0.25 g of liquid compound was dissolved in 5 mL of hexane. 0.25 g of Hi-Sil 233 silica gel was introduced into this mixture of hexane and active ingredient. The solvent was blown-off using a rotary evaporator, allowing for the compound to adsorb to the silica gel. This 0.5 g of silca gel:active ingredient was then used as the solid material used for coating the seeds. The seeds were then coated with the same method used for solid compound.

Western Corn Rootworm Development Assay

Three treated seeds were germinated on one side of a plastic Genpack deli container (32 oz.) 5 days prior to infesting the container with western corn rootworm larvae. On the other side, three untreated seeds were germinated at the same time diagonally across from the treated seeds. Containers were infested by placing 30 rootworm into the middle of the container, on the top of the soil. Rootworm were allowed to choose which side to feed on primarily. Containers infested with western corn rootworm were incubated at 28° C. and 40±10% relative humidity for one week. After one week, containers were removed and soil was mechanically sifted through to quantify the number of living larvae. The total number of larvae present on the treated side vs. the untreated side were averaged from a minimum of three replicates. If repellency was observed (i.e. more rootworm found on the untreated side than the treated side), the experiment was repeated to confirm repellency in subsequent experiments. The number of rootworm missing were also enumerated. Data was averaged from a minimum of three replicates and over 90 larvae used in the total repellency assessment for each compound. A two-way t-test was used to identify which compounds caused a statistically significant repellency response compared to the control treatment (no compound).

Results

The repellency assay developed for this exploration was robust and allowed for the characterization of some compounds to be identified as repellent molecules. For the control treatment, approximately 52% of the larvae isolated from the container at the end of the end of the experimental interval were on the treated side (in control there was no treatment; it was only declared treatment for the purposes of analysis) whereas 48% resided on the untreated side. This indicates that this assay allows for the even distribution of larvae in a system where no chemical challenge exists. When larvae were given the choice between both untreated corn and corn treated with various monoterpenoid esters, many treatments caused a higher number of larvae to be isolated from the untreated end compared to the treated end. This was true for thymyl cinnamate, hexacitronelloyl inositol, hexacinnamoyl inositol, and eugenyl succinate. Hexacitronelloyl inositol was the most successful at preventing larvae from associating with the treated corn seed, with on average only 22% of larvae being associated with the treated corn side.

Moreover, the number of larvae missing were also recorded. Because this was a closed assay, larvae were not able to escape from the enclosure. Instead, missing larvae were declared as dead. Dead larvae desiccate quickly in soil, making it very difficult to find them. The loss of larvae is most likely caused by mortality in the assay. A number of missing larvae were observed when larvae are challenged with seed treated with a particular monoterpenoid derivative on one side of the container. In the control, only 20% of larvae were declared dead. In a majority of the other treatments, higher mortality was observed compared to the control treatment. Of the various seed treatments, ethylene glycol dicitronellate, cinnamyl myristate, triscitronelloyl glycerol, and eugenyl succinate caused higher larval mortality that was statistically significant compared to the control. Because this assay involves only one side that possesses seeds treated with these various compounds, this mortality could be due to contact toxicity, or the larvae feeding on these compounds as they migrate from the treated to untreated sides.

In conclusion, these data show that these compounds could have significant potential in controlling arthropod pests of various crops. Many pests exert their pressure in the root zone. By killing and repelling these pests from treated seeds, it may be possible to significantly increase crop yields.

Example 4—Germination Assays

Materials and Methods

Corn Seeds

Corn seeds obtained were untreated and did not contain any form of pesticide coating. Corn seeds used were a non-transgenic type strain of corn in order to prevent confounding results. Germination typically occurred between 2-4 days after moistening.

Seed Coating (Solid Compounds)

Seed coating was accomplished by placing 20 g of corn seeds or soybeans into a container with approximately 1 mL of a 1:5 Elmer's Glue:water solution with a small amount of Triton-X 100 present (100 µL/5 mL). For solid compounds, 0.25 g of compound was subsequently introduced into the container. This mixture of seeds, Elmer's Glue/water/Triton-X 100 solution, and active compound was mixed thoroughly until seeds were coated with the active ingredient.

Seed Coating (Liquid Compounds)

For each treatment, 0.25 g of liquid compound was dissolved in 5 mL of hexane. Next 0.25 g of Hi-Sil 233 silica gel was introduced into this mixture of hexane and active ingredient. The solvent was blown-off using a rotary evaporator, allowing for the compound to adsorb to the silica gel. This 0.5 g of silca gel:active ingredient was then used as the solid material used for coating the seeds. The seeds were then coated with the same method used for solid compound.

Germination Assays

Three corn seeds coated in one type of active monoterpenoid derivative treatment were germinated in small, 2-oz.

Solo condiment cups with lids. Germination of seeds was performed by carefully applying 500 µL of de-ionized water in order to fully surround each seed with water at the bottom of the cup. Parafilm wax was placed over the top of the cup to maintain moisture and encourage germination of the seeds. Cups containing moistened seeds were allowed to germinate in the dark for 3 days before 30 g of soil was introduced into the cup, with 4.5 mL of water added to the soil to moisten it. Seeds were allowed to grow for one week before removing the soil and assessing total germination. Germination was quantified as whether or not root mats and radicals emerged from the moistened seed casing. The total number of seeds in each cup (out of three seeds) that germinated were quantified. Over 4 replicates of this experiment were performed for each monoterpenoid derivative treatment screened.

Results

Numerous seed treatments were herbicidal to corn seed treated with these compounds. Of the compounds cinnamyl hydrogen succinate, carvacryl succinate, inositol hexacitronellate, eugenyl citronellate, 1,3-biscitronelloyl glycerol were the most significant inhibitors of germination of corn seedlings. These compounds may comprise the future forms of herbicidal active ingredients in future formulations. A vast majority of these compounds were also observed to not inhibit the germination of corn seeds suggesting their utility as future viable seed treatments for the control of insect pests.

To the extent necessary to provide descriptive support, it shall be understood that the subject matter and/or text of any appended claims are incorporated herein by reference in their entirety.

It will be understood by all readers of this written description that the example embodiments described herein may be suitably practiced in the absence of any recited feature, element or step that is, or is not, specifically disclosed herein.

What is claimed is:

1. A method for killing or repelling an insect that feeds on seeds or germinated seeds, comprising the step of:
   exposing the insect to a seed treated with a composition consisting essentially of a carrier and an insecticidal compound having a structure from the groups consisting of

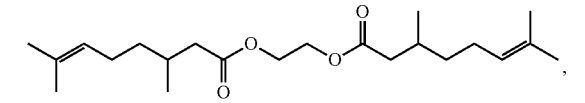
,

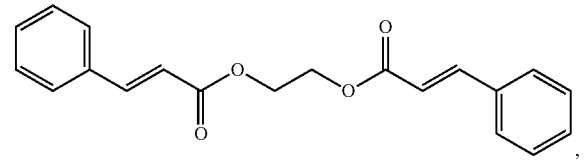
,

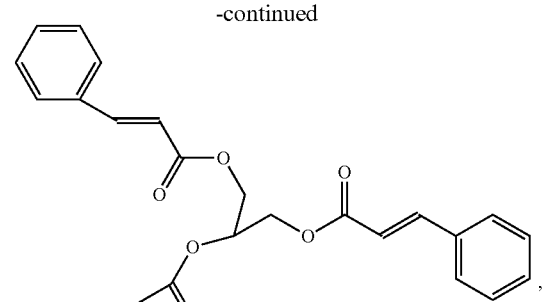
,

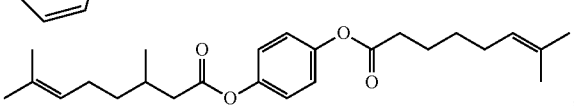
,

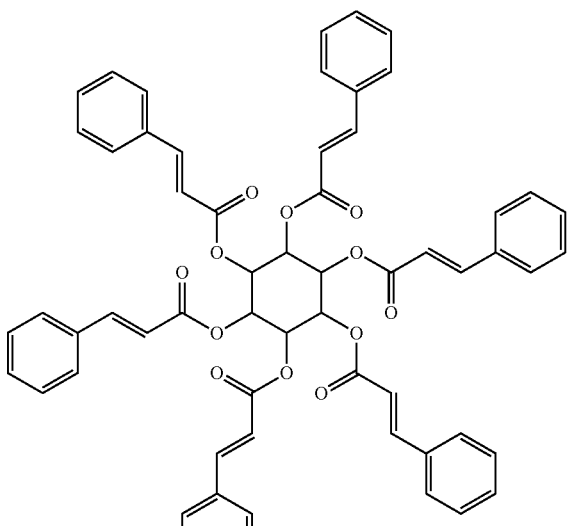
,

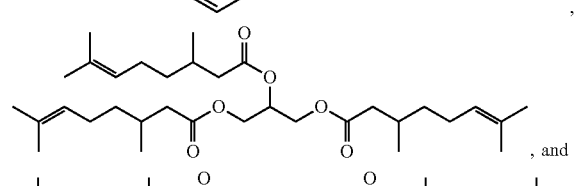
, and

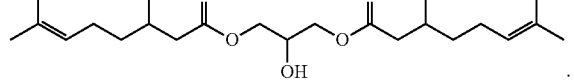
.

2. The method for killing or repelling an insect according to claim 1, wherein the insecticidal compound is selected from the group consisting of: ethylene dicitronellate, hexacitronelloylinositol, dicitronelloylhydroquinone, tricitronelloylglycerol, and dicitronelloylglycerol.

* * * * *